United States Patent [19]
Lidman et al.

[11] Patent Number: 5,928,702
[45] Date of Patent: Jul. 27, 1999

[54] METHOD FOR CONTINUOUS PRODUCTION OF MILK WITH A PREDETERMINED FAT CONTENT

[75] Inventors: Magnus Lidman, Rönninnge, Sweden; Guido Marzotto, Milan, Italy

[73] Assignee: ALFA Laval Agri AB, Tumba, Sweden

[21] Appl. No.: 08/545,618

[22] PCT Filed: May 2, 1994

[86] PCT No.: PCT/SE94/00395

§ 371 Date: Jan. 16, 1996

§ 102(e) Date: Jan. 16, 1996

[87] PCT Pub. No.: WO94/24878

PCT Pub. Date: Nov. 10, 1994

[30] Foreign Application Priority Data

May 3, 1993 [SE] Sweden ................................... 9301507

[51] Int. Cl.⁶ ....................................................... A23C 9/00
[52] U.S. Cl. ......................... 426/580; 426/490; 426/491; 426/586; 426/587
[58] Field of Search .................................. 426/491, 580, 426/586, 478, 490, 587

[56] References Cited

U.S. PATENT DOCUMENTS

| | | |
|---|---|---|
| 3,829,584 | 8/1974 | Seiberling ................................. 426/665 |
| 3,946,113 | 3/1976 | Seiberling ................................. 426/491 |
| 3,983,257 | 9/1976 | Malmberg et al. . |
| 4,017,643 | 4/1977 | Lester ...................................... 426/491 |
| 4,074,622 | 2/1978 | Niemeyer ................................. 426/491 |
| 4,144,804 | 3/1979 | O'Keefe et al. . |
| 5,137,738 | 8/1992 | Wynn . |

FOREIGN PATENT DOCUMENTS

| | | |
|---|---|---|
| PCT NL8900059 | 7/1989 | WIPO . |

*Primary Examiner*—Leslie Wong
*Attorney, Agent, or Firm*—Hovey, Williams, Timmons & Collins

[57] ABSTRACT

Continuous production of milk with a predetermined fat content wherein whole milk is divided into a cream fraction and a skim milk fraction in a centrifugal separator. A part of the cream fraction is remixed into the skim milk fraction in order to obtain a mixed fraction of milk with desired fat content. The whole flow of cream fraction which has been obtained from an outlet from the centrifugal separator is remixed with a flow of skim milk fraction from a second outlet from the centrifugal separator by way of a valve in the outlet for cream fraction during a certain period. During a second intermediate period the whole flow of cream fraction is discharged by the valve for separate collection. The periods mentioned above are so short that the fat content and the flow per time unit of the mixed fraction may be regarded as homogenous.

6 Claims, 2 Drawing Sheets

METHOD FOR CONTINUOUS PRODUCTION OF MILK WITH A PREDETERMINED FAT CONTENT

BACKGROUND OF THE INVENTION

1. Field of the Invention

The present invention relates to a method for continuous production of milk with a predetermined fat content. Whole milk is divided into a cream fraction and a skim milk fraction in a centrifugal separator. A part of the cream fraction is remixed into the skim milk fraction in order to obtain a mixed fraction of milk with a desired fat content.

2. Description of the Prior Art

The natural fat content of the milk varies with feeding and time of the year, but has usually an average value of about 4% fat. Consumer milk is usually for sale with a lower fat content 3,0, 1,5 or 0,5% fat. In smaller production scale it is possible to carry through the standardization in batches by dividing the whole milk into cream and skim milk in a centrifugal separator. Quantities of skim milk and cream which have been calculated in advance are led from the separator to a common collection vessel. After analysis of the fat content and a possible adjustment of the same the milk is packaged.

In modern dairies the standardization takes place as a continuous process by automatic direct standardization. In this process the whole milk is divided into two flows, cream and skim milk with constant fat contents in respective flow. In an "in-line"-system directly after the separator a controlled amount of cream is remixed with the skim milk in such a way that standardized milk with the desired fat content is obtained.

In the earliest processes for direct standardization the separator was provided with two manually operated control valves in the outlet for cream. One of the valves was connected to the outlet for skim milk and controlled the amount of cream which should be brought back to the skim milk. The second valve controlled the flow of surplus cream. The fat content in the cream was determined by how much the both valves were open altogether. The fat content of the standardized milk was determined by the fat content of the returned cream and the adjustment of the return valve. The adjustment of the position of the valves demanded skilled personnel. The exact fat content could be measured only by means of analysis at a laboratory.

In the processes for standardization which are used today in the dairies two control circuits are used. One circuit controls the flow of cream out from the separator. This circuit comprises flow meter for the cream flow, density transmitters which measure the fat content in the cream and a control valve arranged after the flow meter and the density transmitter. A second circuit controls the amount of cream which is remixed with the skim milk in order to give a standardized milk with a desired fat content. The flow of standardized milk is monitored as well as the flow of cream for remixing.

When using dairy processes in small scale on the farm the earlier method for standardization of fat makes too high demands on the personnel. The latter automatic method demands on the other hand too an expensive investment for a small scale production.

SUMMARY OF THE INVENTION

According to the method of the invention a standardization method is suggested which to low investment and operating costs may be used for milk standardization also in a smaller scale. The method according to the invention is mainly characterized in that the whole flow of cream fraction which has been obtained from the centrifugal separator during a certain period is remixed with the flow of skim milk fraction from the centrifugal separator by way of valve means arranged in the outlet for cream fraction, while the whole flow of cream fraction during a second intermediate period is diverted for separate collection by way of said valve means. The said periods are so short that the fat content and flow per time unit of the mixed fraction may be regarded as homogenous.

By way of the proposed method a satisfactory standardization may be obtained with only a time controlled valve arrangement, which results in a drastic reduction of the costs to obtain a standardization of the milk. Any monitoring equipment or complicated routines are not necessary for the personnel which handles the standardization.

In order that the fat content and flow per time unit of the mixed fraction shall be regarded as homogenous the periods for remixing and diverting must be kept short. Preferably the total time for the two periods mentioned above is maximally one or a few minutes.

The length of time for the cycle which may be allowed depends on the equipment which is located after the centrifugal separator. If some kind of balance vessel for a short intermediate storage is arranged after the separator but in front of for example a packaging machine the cycle time may be longer than if the standardized milk should be pasteurized directly after the centrifugal separator.

The cycle time may with advantage be kept as short as 1–60 seconds.

The valve means which is used according to the method of the invention suitably consists of a three-way valve with a change over time of 100–150 ms. Another arrangement which may be used consists for example of two cut off valves.

The movement of the valve means between the positions of the valve is with advantage obtained by controlling the time, at which the cycle time is kept constant while the period during which cream is remixed varies depending on desired fat content of the mixed fraction.

The centrifugal separator is with advantage provided with valves which keep the flow constant in both outlets in such a way that the centrifugal separator works under constant conditions independently if the cream fraction is remixed or led away, which valves are arranged upstreams of the mentioned valve means.

According to the method of the invention there is obtained an accurate standardization which only inconsiderably is effected of how the cream flow is led. For a separator with paring discs the outer characteristic of constant working conditions is that the counter pressures on the paring disc are constant. Surprisingly it has been found that the counter pressure on the paring disc may be kept satisfactorily constant during short cycle times without an accurate control of the outer counter pressure. The aim is of course to keep the same pressure in the conduit for surplus cream as in the return conduit connected to the conduit for skim milk but variations may occur. It leads to a complicated controlling problem if the pressures always must be exactly the same. For a separator which together with a pasteurizer works with 1000 l. milk/hour and with a cycle time of 40 seconds and a remixing of 50%, there was measured a pressure variation at the paring disc of 30 kPa, when the cream flow was $\frac{1}{10}$ of the supplied milk flow. At a cycle time of 5 seconds the pressure variations were less then 5 kPa during in other respects constant conditions, which may be considered as satisfactory.

If the pressures in both positions of the valve are experienced as so equal that the levels in the separator do not change, the fat content in the standardized milk will only depend on the fat content of the supplied milk and on the distribution of the time of the valve means in the respective open condition.

The fat content in the unseparated milk is depending among all of the feeding of the cows. This is something that the milk producer is well aware of and may control each week or with still longer intervals of time.

With the method according to the invention the milk may be obtained with different fat contents only by adjusting a timer which within the set cycle time controls the length of the time during which cream is remixed. A certain time then corresponds to a certain fat content of the standardized milk.

If the surplus cream is discharged with a fat content of 40% the cream flow is about 10% of the supplied milk flow. The product flow of standardized milk will then consequently vary between 90 and 100% of the supplied milk flow.

DESCRIPTION OF THE PREFERRED EMBODIMENT

Figure 1:
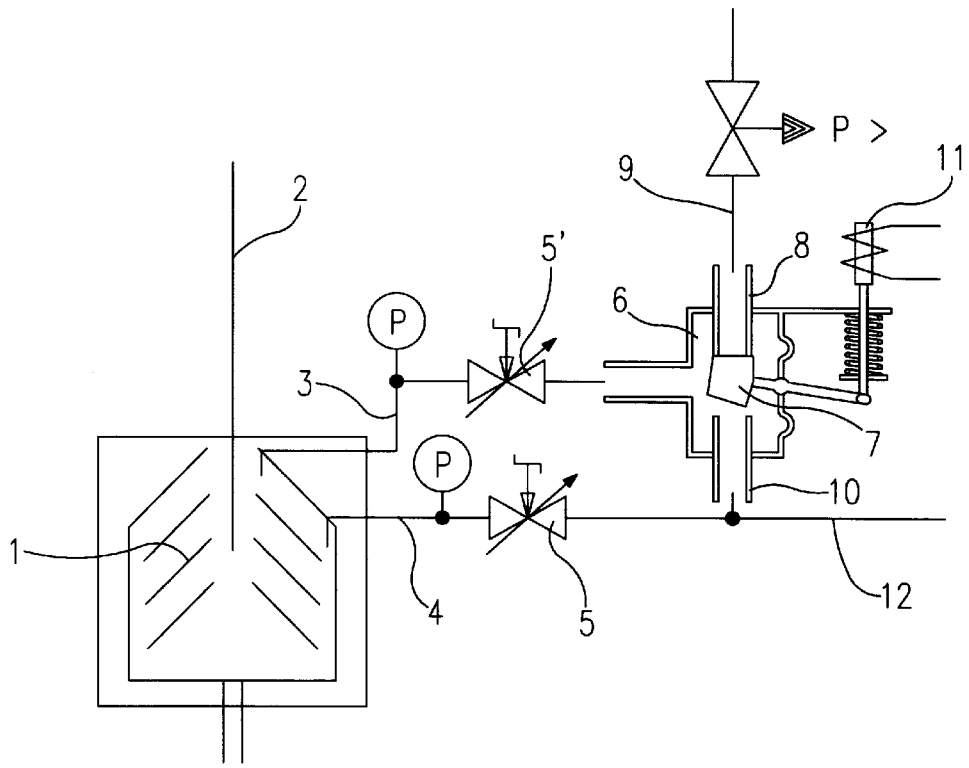
FIG. 1 is a schematic flow diagram showing a centrifugal separator provided with valve means chosen as an example of an arrangement for production of milk with a predetermined fat content.

Whole milk is led to a centrifugal separator 1 by way of a conduit 2. In the separator the milk is divided into two fractions, a cream fraction which is led away by way of the outlet 3 and a skim milk fraction which is led away by way of the outlet 4. In both of the outlets there are valves 5, 5' which control the flow out from the separator. After this valve 5' there is in the cream conduit a three-way valve 6. The latter comprises a valve body 7 which in one of its positions seals an outlet 8 to a conduit 9 for discharge of surplus cream, which valve position is shown in the drawing. In its second position the valve body seals an outlet 10 which is connected to a conduit for return of cream to the skim milk conduit 4. The valve body is kept in one of its positions by a spring and is actuated by an electro-magnet 11 to take its second position. The standardized milk with the desired fat content is discharged by way of the conduit 12.

Figure 2:
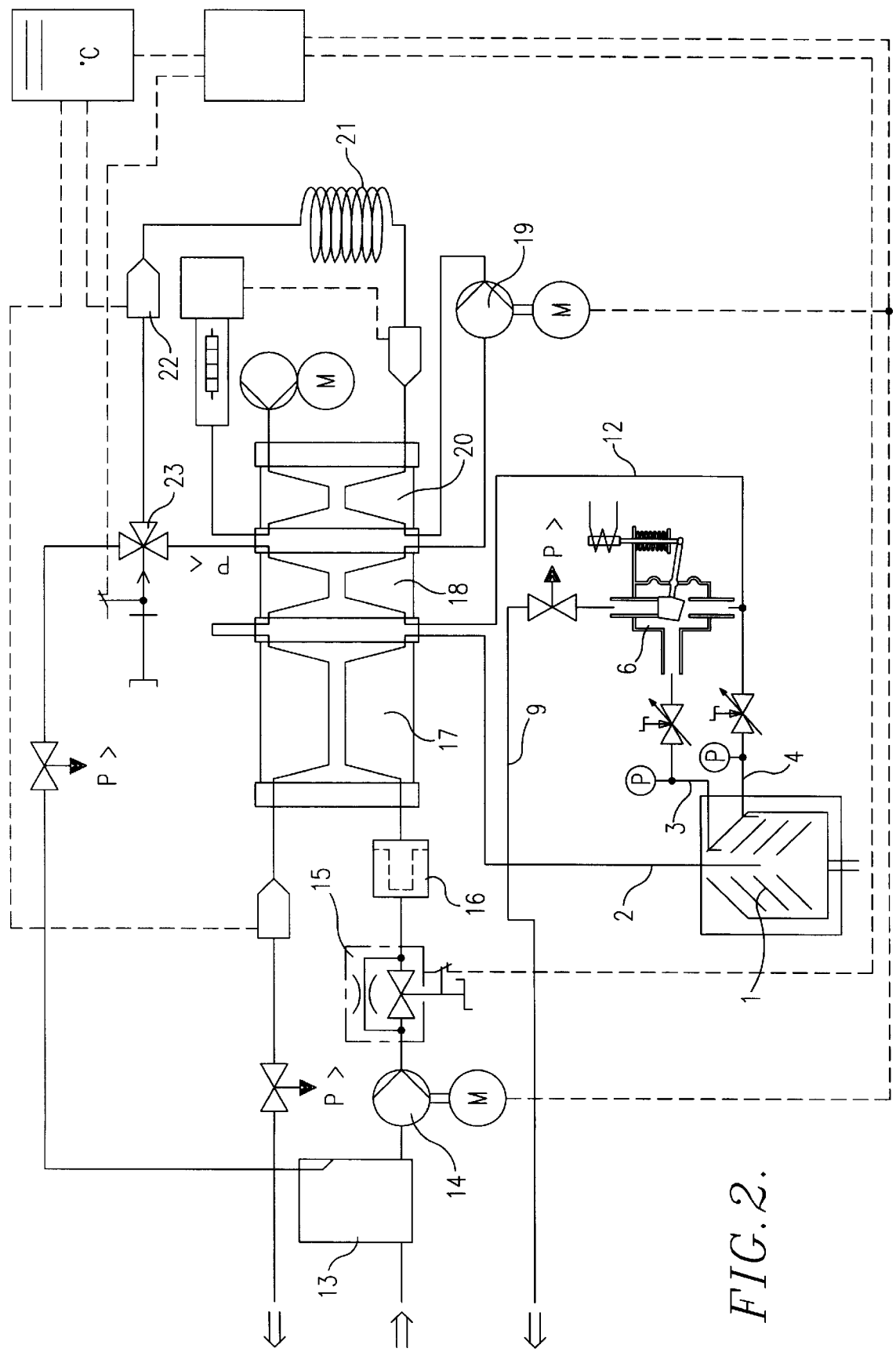
FIG. 2 is a schematic flow diagram showing the centrifugal separator according to FIG. 1 as a part of a pasteurization plant.

In FIG. 2 there is shown an example on how a separator with the valve arrangement may be arranged in a pasteurizing plant. Whole milk is led to a balance vessel 13 and is transported by means of a pump 14, a valve 15 which gives the correct flow of product and a milk filter 16 to a first regenerative section 17 in a plate heat exchanger. In this the milk is preheated by product which already has been treated in the pasteurizing plant to a suitable temperature of 40–65° C. for the separation in the centrifugal separator 1. As has been described above the whole milk is divided into two fractions, a cream fraction which during a certain period is remixed with the skim milk fraction 4 and which during a second period is discharged by way of a conduit 9. The mixed fraction of skim milk and cream is by way of the conduit 12 led to a second regenerative section 18 in the plate heat exchanger. After a further preheating the pressure of the mixed fraction is increased with a booster pump 19, before the milk is heated to a pasteurizing temperature by a heating medium in a final heating step 20. The milk is kept at pasteurizing temperature in a holding cell 21 during a predetermined time. The temperature of the standardized milk after the holding cell is sensed by a temperature meter 22 and if the temperature is too low the milk is returned to the balance tank 13 by a three way valve 23. If the temperature is correct the milk is directed to the regenerative sections 17, 18 in the heat exchanger in order to be cooled by entering product to a suitable storing temperature.

In an arrangement according to FIG. 2 a part of the cream fraction is led away without having been pasteurized. The pasteurization of the cream may then take place in a separate step separated from the milk pasteurizing.

If the surplus cream is taken out with a fat content of 40% the cream flow will be 10% of the supplied whole milk. The flow of standardized milk which is returned to the pasteurizer varies in cycles between 90 and 100% of the supplied milk flow. Also the fat content varies in the flow back to the pasteurizer. If the cycle time is short, 5–10 seconds, both the fat content and the flow are rapidly equalized during the subsequent passage through the pasteurizer. If a shorter cycle time than 1 second is used differences in the change-over time of the valve creates too great an influence. The change-over time should be 100–150 ms.

Figure 3:
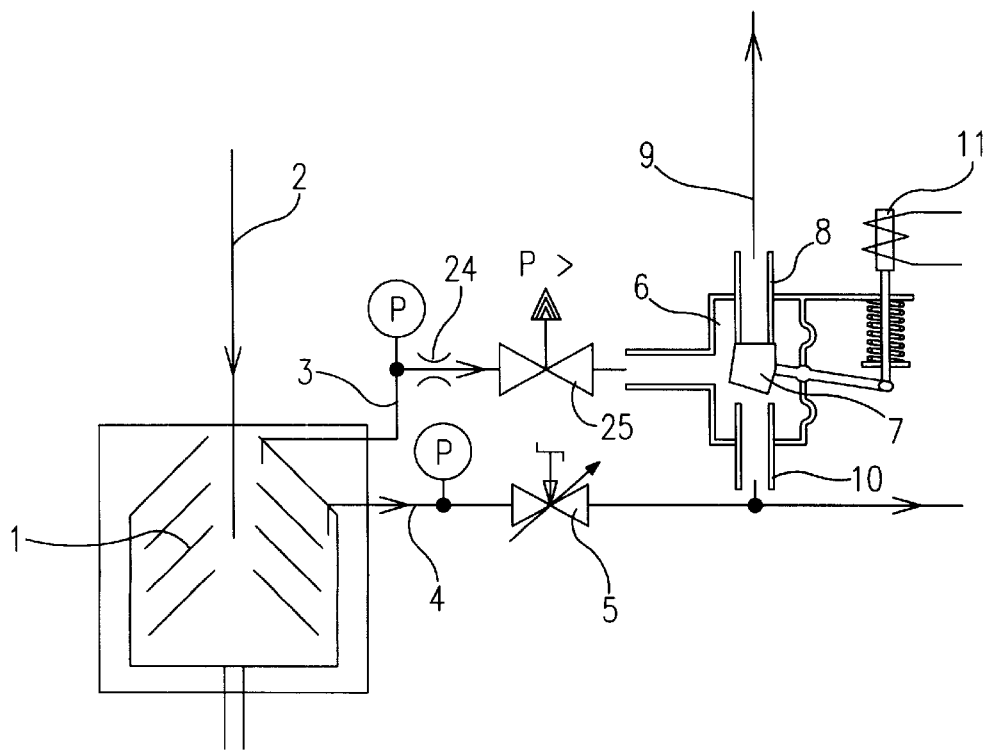
FIG. 3 is a schematic flow diagram of a centrifugal separator showing an alternate arrangement to that depicted in FIG. 1.

In the alternative arrangement shown in FIG. 3 a throttling 24 is arranged in the outlet 3 next to the centrifugal separator 1. There is also a constant pressure valve 25 in the same outlet. With such an arrangement the fat content in the cream fraction may be kept constant at a desired level. The cream fraction is remixed with the skim milk fraction in the same way as described above.

According to the method of the invention there is obtained a standardization of the milk with a simple and uncomplicated control by way of a simple valve arrangement. The method does not demand any resetting after an adjustment of the shifting motors which may delay adjustment to the correct level of standardization and does not demand sensors for sensing the fat content values. Start and stop are simple both with manual operation and when sequence control is used. If it is desired the separator may be connected to the outlet side of the pasteurizer such that the standardization is carried through firstly after the pasteurization. With such an arrangement also the cream is pasteurized.

It is also possible to use a small control means as an additional feature in order to adjust the fat content in the standardized milk. This control means actuate the period during which the cream is returned to the skim milk. The following data must be supplied to the control means; the fat content of the supplied, unseparated milk, the fat content of the cream fraction (controlled by the constant pressure valve) and the desired fat of the standardized milk.

We claim:

1. A method for continuous production of milk with a predetermined fat content, comprising the steps of:

supplying whole milk to a centrifugal separator;

dividing the whole milk into a cream fraction and a skim milk fraction at the centrifugal separator;

continuously delivering the skim milk fraction to an outlet conduit for mixed standardized milk product; and remixing a part of the cream fraction into the skim milk fraction in order to achieve a mixed standardized milk product with a predetermined desired fat content, said remixing step including providing valve means and alternately shifting said valve means between a first position for remixing all of the cream fraction with the skim milk fraction during a first selected time period and a second position for discharge of all of said cream fraction for separate collection without remixing with said skim milk fraction during a second selected time period, said first and second time periods being sufficiently short in duration that the fat content and the flow per time unit of the standardized milk product are substantially homogeneous.

2. A method according to claim 1, wherein the total time for the first and second time periods is defined as the cycle time, and the cycle time for the remixing step is maximally one or a few minutes.

3. A method according to claim 2, wherein the cycle time is between about 1–60 seconds.

4. A method according to claim 1, wherein the valve means consists of a three-way valve with a change-over time of 100–150 ms.

5. A method according to claim 2, wherein the valve means is actuated by time control, at which the cycle time is kept constant while the first period for remixing cream varies in dependence on the desired fat content of the mixed fraction.

6. A method according to claim 1, including the step of providing valves which are arranged in the outlet from the centrifugal separator in such a way that the separator works with constant conditions independently if the cream fraction is remixed or discharged, which valves are arranged upstream of said valve means.

* * * * *